United States Patent

[11] 3,585,856

[72] Inventor William D. Schaeffer
Coopersburg, Pa.
[21] Appl. No. 883,489
[22] Filed Dec. 9, 1969
[45] Patented June 22, 1971
[73] Assignee National Printing Ink Research Institute
New York, N.Y.
Continuation-in-part of application Ser. No. 765,818, Oct. 8, 1968, now abandoned.

[54] MANUAL TACK MEASUREMENT
13 Claims, 8 Drawing Figs.
[52] U.S. Cl. .................................................. 73/150
[51] Int. Cl. .................................................. G01n 19/09
[50] Field of Search ............................................. 73/150, 141 A

[56] References Cited
UNITED STATES PATENTS
1,260,869  3/1918  Carlson ........................ 73/141
2,113,725  4/1938  Goldman ....................... 73/150
3,165,925  1/1965  Sachers ........................ 73/141
3,214,971  11/1965  Hammond, Jr. ............... 73/150
3,336,797  8/1967  Raffalovich .................... 73/150

Primary Examiner—Louis R. Prince
Assistant Examiner—William A. Henry, II
Attorney—William Steell Jackson & Sons ABSTRACT: To measure tack of a fluid film by the finger, using a push-pull gage, the motion of a probe from the null position under the force of the finger is limited to less than 1 millimeter, and the maximum force recorded during repeated rapid retraction of the finger and splitting of the film. Fifteen to twenty splitting cycles of a single film are required in a single test to obtain the maximum reading. The film thickness after distribution in the multiple splitting cycles is from 10 to 40 microns. In testing films of the character of printing inks, the maximum spring biasing force opposing the pull is in the range of 1 to 2 kilograms. In the preferred form, the probe is circular or square, and has a surface area between 0.18 and 0.30 square inch.

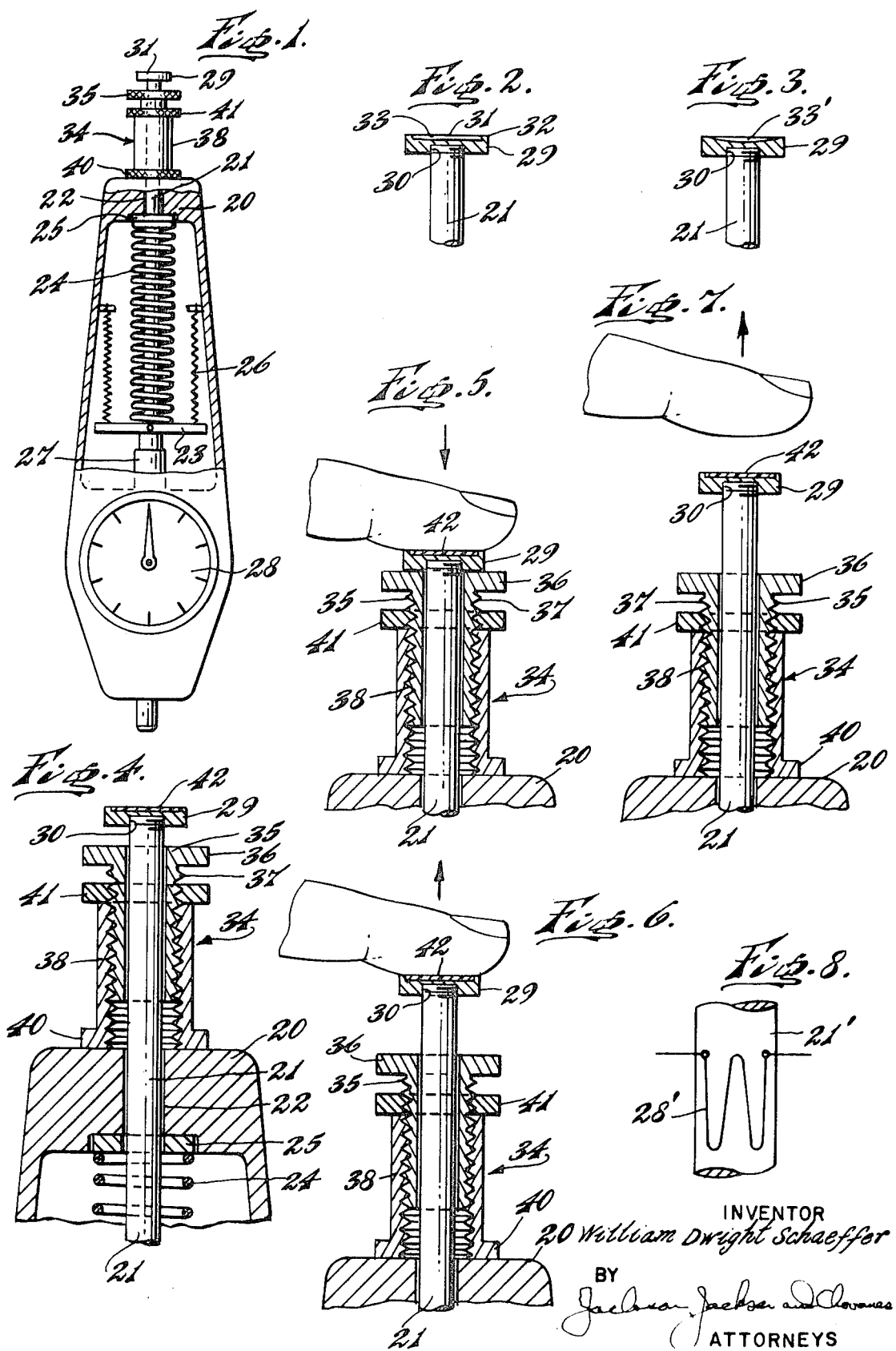
INVENTOR
William Dwight Schaeffer
BY
Jackson, Jackson and Clovanes
ATTORNEYS

MANUAL TACK MEASUREMENT

The present application is a continuation-in-part of my copending application, Ser. No. 765,818, filed Oct. 8, 1968 now abandoned for TACK MEASURING.

The present invention relates to measuring tack of fluid films such as printing inks, plastics, adhesives, cements, glues, resins, polymers, paints, varnishes, lacquers, enamels, putties, emulsions, pastes, doughs, plastisols and coatings. One use is in the control of printing ink tack so as to prevent the pick of coated papers. Another application is in connection with the tack of a series of process inks which are to be imprinted wet in sequence so as to provide multicolor reproductions. The tack of each ink is reduced for the series of multiple impressions so that the last down ink is split without disrupting the previously printed ink films.

A purpose of the invention is to render the testing of tack by the human finger more accurate and reliable, reducing the effect of variation due to the practice of the individual making the test.

A further purpose is to prevent nonconcordant test results due to differences in practice of the person running the test in pushing the probe to gain adherence of the finger, by limiting the motion of the probe under the push of the finger to from zero to not in excess of 1 millimeter.

A further purpose is to apply a film to the probe of such volume as to provide a thickness in the range of 10 to 40 microns during testing, and thus avoid variations in tack testing results because of differences in film thickness.

A further purpose is to provide on the probe a depression of generally uniform depths of between 10 and 40 microns, and to establish the film thickness by squeezing or doctoring.

A further purpose is to provide on the probe a depression having a maximum depth of between 100 and 150 microns and conforming to the surface of a sphere, and to secure the desired film thickness by squeezing or doctoring.

A further purpose in testing for tack of printing inks or the like is to regulate the maximum biasing force of the gage resisting pulling to a range of 1 to 2 kilograms.

A further purpose is to limit the area of the probe to be contacted by the finger to an area within the range of 0.18 and 0.30 square inch.

Further purposes appear in the specification and in the claim.

In the drawings I have chosen to illustrate a few only of the numerous embodiments in which my invention may appear, selecting the forms shown from the standpoint of convenience in illustration, satisfactory operation and clear demonstration of the principles involved.

FIG. 1 is a side elevation partially in section showing the gage of the invention.

FIG. 2 is an enlarged axial section through a preferred form of probe used in the invention.

FIG. 3 is an enlarged axial section through a probe of alternate form.

FIGS. 4 to 7 are diagrammatic fragmentary elevations indicating steps in making the test.

FIG. 8 is a diagrammatic fragmentary side elevation of a modified form of gage for use in the invention.

In the prior art, tack testing of fluids is important in order to determine the behavior of films thereof in printing, adhesive application and the like. When reference is made to fluids, it is intended to indicate fluids in the rheological sense in that a thin film of the fluid is capable of undergoing rapid splitting in a testing technique to indicate the extent of tackiness. A fluid in this sense can exhibit viscous flow when the rate of flow is comparable to the rate of deformation. The fluid can also exhibit an elastic response when the time of deformation is shorter than the relaxation time of the fluid.

A classical method of measuring tack in connection with printing, printing inks and adhesives, is to split a thin film rapidly either between the fingers or between a finger and a plate or probe to which the other side of the film is attached. The resistance developed to the rapid splitting of a thin film is evaluated subjectively on the basis of the experience of the operator. People of unusual background can reach a reasonable approximation of the tackiness of a film by this procedure, but persons of less experience are likely to differ widely in their evaluations. One of the objectives of the present invention is to make it possible for various people to arrive at approximately the same result regardless of skill and experience.

Because of the difficulty in testing by the prior finger method, numerous instruments have been developed which depend upon the force required to split fluid films. Sometimes the splitting is accomplished between cooperating probes or plates and in other cases between rolls. Many of the existing mechanisms are complicated, bulky and expensive and the results obtained do not always agree with the experience from the prior subjective tests.

Hammond U.S. Pat. No. 3,214,971, granted Nov. 2, 1965 for Tack Testing Apparatus, uses a push-pull gage for measuring tack. The pressure required to establish adhesion to the tacky polymeric film is controlled by a weight which may have a protruding flat center surrounded by a setback flange. The speed of separation of the weight from the probe is controlled by using a drive to separate the components at a carefully controlled speed. This gage is necessarily heavy and expensive.

One objective of the present invention is to provide a very simple and inexpensive gage which is readily portable, and which will give reliable measurements of tack by an improvement over the classical finger or tactile method.

In accordance with the invention, a preferred embodiment is a modification of a dial push-pull gage. Such gages are well known in the art. One of them manufactured by Hunter Spring Company, of Lansdale, Pa., is described in U.S. Pat. No. 2,612,042, granted Sept. 30, 1952 for Force Measuring Device, and also in the Hammond Patent aforesaid. Another manufactured by John Chatillon & Sons, 85 Cliff Street, New York, N.Y., is described in Sachers U.S. Pat. No. 3,165,925, granted Jan. 19, 1965 for Push-Pull Gauge and Magnetic Overrunning Locking Means.

Push-pull gages as normally employed have a null position and a substantial freedom of motion in the pushing direction, of the order of about 5 millimeters. When the finger is applied to a probe or plate bearing the fluid film and standing in the null position, there is a considerable amount of discretion by the individual making the test as to how far he will depress or push the probe. I have discovered that one of the causes of substantial variation in the readings obtained by different people or by the same person running the tests at different times, is that the probe is pushed down for different distances and thus gives varying amounts of acceleration in its return through the null position as the person running the test pulls his finger away. I have also discovered that if the range of motion of the probe from the null position in the pushing direction is limited to not exceeding 1 millimeter and preferably to zero, as for example by an adjustable stop, concordance results are obtained by various people running the test even though they may depress the probe by pushing for different distances not exceeding 1 millimeter. It is preferred to place the probe exactly at the null position to start the test, although if there is danger of placing the probe beyond the null position, it can be placed at a point say 0.01 millimeter short of the null position at the start of the test, and to permit slight motion of the probe to assure that the null point is properly placed.

I have also discovered that one cause of lack of concordance of test results in testing tack by the finger is testing of excessively thin or excessively thick films. If the range of film thickness is between 10 and 40 microns, variation of film thickness within this range does not lead to substantial difference in test results.

The desired thickness can be achieved by a depression of generally uniform thickness between 10 and 40 microns deep or by a depression of spherical shape having a maximum thickness of 100 to 150 microns, in either case filling the depression with the test fluid by squeezing or doctoring.

For films having tackiness ranges similar to printing inks, a spring having a maximum biasing force of 1 to 2 kilograms is often necessary. It will be evident that the range of the gage can be extended by counterweights, if desired.

It is important in the present invention that the probe should have an area which will be less than but approach the area of an adult finger (normally the second finger from the thumb) available for contact with the liquid film under test and thus minimize the variability among operators due to differences in finger areas. For best results in this respect, the probe cross section should be circular or square and have an area between 0.18 and 0.30 square inch which corresponds to a diameter of a circular probe of between one-half and five-eighths inch.

As shown in the drawings, the gage of the invention in one embodiment comprises a housing 20 having extended through it a plunger or shaft 21 which is guided at opposite ends in suitable sliding bearings 22 so that it is free to move longitudinally in either direction as in any well known push-pull force gage. The plunger 21 carries thereon a collar 23. A compression main spring 24 surrounds the plunger and is engaged at one end by the collar 23. At the other end the spring 24 engages an anchorage 25 on the housing which has an opening through which the plunger passes in sliding relation. The main spring 24 is maintained under precompression due to preloading tension springs 26 which are attached to the housing 20 at one end and to the collar 23 at the other end. The collar 23 has a suitable extension 27 which provides contact points for moving a gage dial 28 through any suitable connection which may be a conventional rack and pinion or a magnetic connection, as well known in the art.

While a mechanical push-pull force gage is preferred, it will be understood that any other suitable push-pull gage which can measure force will be proper for use in the present invention, for example, a strain gage or load cell. This may simply be the gage with a strain gage or load cell to evaluate the pull, reading on an electric meter. Of course, the strain gage or load cell may have the springs built into it.

FIG. 8 shows a highly elastic plunger 21' having cemented thereto a bonded strain gage 28' connected to suitable indicating means not shown.

At the end of the gage at which testing is to be carried on, a probe 29 is secured to the plunger 21 as by threading at 30. In the preferred embodiment, the probe 29 at its surface 31 remote from the gage has a rim 32 (FIG. 2) forming a depression 33 of a generally uniform depth of between 10 and 40 microns, or it has a depression 33' like the surface of a sphere of maximum depth between 100 and 150 microns, as shown in FIG. 3. In either case, the film thickness can be controlled readily by applying the fluid with a doctor blade as is well known in the art.

Surrounding the plunger 21 and extending between the housing 20 of the push-pull gage and the probe 29 is a stop 34 of the present invention which limits the depression of the probe under push of the finger to 1 millimeter and is preferably adjustable to hold the probe exactly at the null position. If doubt exists as to the ability to set the probe at the exact location of the null point, the setting may be say 0.01 millimeter short the null point, up to 1 millimeter as a limit.

The stop 34 comprises a sleeve 35 loosely fitting around the plunger 21, having a knurled portion 36 at the end remote from the housing to permit engaging by the finger or by pliers, which is threaded at 37 into a cooperating telescoping threaded sleeve 38 which has a knurled portion 40 for engagement by the finger or the pliers at the end next to housing 20. The height of the stop can thus be adjusted by adjusting threads and the adjusted position can be maintained by tightening a locknut 41 which is on the threaded sleeve 35 and which engages the end of the sleeve 38. Optionally the stop can be threaded on the end of the housing. Any other suitable adjustable stop can be employed.

In the preferred embodiment of the invention, the push-pull gage springs are changed or adjusted so that for testing printing inks and the like, the maximum biasing force in the pulling direction is in the range of 1 to 2 kilograms.

In order that the cross section of the probe should be reasonable for conformity to the ordinary adult finger, it should have a configuration such as round, square, hexagonal or the like with an area of 0.18 to 0.30 square inch.

In operation of the testing device according to the invention, with the stop adjusted so that the permitted depression is not in excess of 1 millimeter, the fluid film 42 is applied to the probe and the sample volume fixed by squeezing or doctoring to provide a thickness which preferably is in the range of 10 to 40 microns after redistribution, FIG. 4. The person making the test pushes his finger against the film, and this will depress the probe in the pushing direction as shown in FIG. 5. Then he quickly withdraws his finger in the direction normal to the surface of the film as in FIG. 6, causing the film to separate, as in FIG. 7. The steps of contacting the film with the finger and separation of the finger and plate are repeated 15 to 20 times in as many seconds. This causes a maximum motion of the gage in the pulling direction which is read on the dial.

In the preferred embodiment of the invention, the dial is of the character which automatically records the maximum of all displacements until it is reset. The practice in accordance with the invention is normally to split the liquid film 15 to 20 times within as many seconds, and report the highest displacement in the pulling direction as the tack reading. The present invention gives concordant results free from the error which was formerly caused by variable acceleration when the probe was permitted to depress over a wide range, for example 5 millimeters.

Since the stop may be applied as an adaptation to a commercial gage, by simply removing the probe, inserting the stop and replacing the probe, it will be evident that the stop can be made of any desired material which will conveniently conform to the material of the housing of the gage, for example, metal, plastic or the like.

Experiments have been conducted in order to test the validity of the principle of limiting the depression of the probe in the pushing direction. Using a limit of depression of 1 millimeter, it has been found that the maximum for the tack reading can be determined in 15 to 20 splitting cycles. Using gages in which the permissible range of depression of the probe in the pushing direction was 2 millimeters and also 5 millimeters, it was found that the maximum force of splitting increased with increasing number of splitting cycles, and that constant results were not obtained after as many as 60 splitting cycles applied by the same finger to the same film.

In view of my invention and disclosure, variations and modifications to meet individual whim or particular need will doubtless become evident to others skilled in the art to obtain all or part of the benefits of my invention without copying the process and mechanism shown.

Having thus described my invention what I claim as new and desire to secure by Letters Patent is:

1. A process of measuring the tackiness of a fluid film, which comprises maintaining a test probe at a null position, applying the film on the test probe of an area not greater than that of a conforming finger, pushing a conforming finger to gain adhesion against the film opposed by a predetermined resistance and with a limited permitted range of movement against the resistance not in excess of 1 millimeter, rapidly pulling the finger away from the film in a direction generally normal to the film surface and thus pulling the probe through the null position, while the probe is biased in the normal direction against motion with the finger beyond the null position, immediately recontacting the film, repressing the finger against the film and pulling the finger away from the film in a direction generally normal to the surface and thus pulling the probe through the null position, repeating the splitting cycle a total of 15 to 20 times, and measuring the maximum range of motion of the probe beyond the null position in the normal direction under the pull imparted by the withdrawal of the finger in any one film splitting cycle.

2. A process of claim 1, which comprises applying to the plate a predetermined volume of tacky fluid sufficient to provide a film thickness in the range of 10 to 40 microns when spread uniformly on the test probe by the repeated contact between test probe and finger during the 15 to 20 splitting cycles comprising a single test.

3. A process of claim 1, in which the probe at the beginning of each cycle is supported exactly at the null point.

4. A process of claim 1, in which the maximum biasing force beyond the null position is in the range of 1 to 2 kilograms.

5. A process of claim 1, in which the range of permitted motion of the probe under the push of the finger in gaining adherence to the film is in the range of 0.01 to 1 millimeter.

6. In mechanism for testing to determine the tackiness of a fluid film, a probe adapted to receive a film for test by application of a finger, having an accessible surface at right angles to the length and of an area not greater than that of a conforming finger, a push-pull gage supporting the probe and including biasing means acting in both directions from a null position, the gage being adapted to record displacement of the probe under the pull of the finger, means on the gauge to record the maximum motion of the probe in any of a multiplicity of splitting cycles employed in a particular test, and means for limiting motion of the probe under the push of the finger in gaining adherence to the film to a range not in excess of one millimeter.

7. Mechanisms of claim 6 in which the gauge includes means to record the maximum motion of the probe in any one of 15 to 20 splitting cycles employed in each test.

8. Mechanism of claim 6, in combination with a depression on the surface of the probe of such volume as to provide a film thickness in the range of 10 to 40 microns which spreads uniformly on the probe by the repeated contact between the probe and the finger during the fifteen to twenty splitting cycles comprising a single test.

9. Mechanism of claim 8, in which the depression conforms to the surface of a sphere with a maximum depth of 100 to 150 microns.

10. Mechanism of claim 8, in which the depression on the surface of the probe has a general uniform depth of 10 to 40 microns.

11. Mechanism of claim 8, having biasing means whose maximum force is in the range of 1 to 2 kilograms.

12. Mechanism of claim 6, in which the means for limiting the motion of the probe under the push of the finger in gaining adherence to the film is adjustable in a range from 0.01 to 1 millimeter.

13. Mechanism of claim 6, in which the probe is held in inactive position at approximately the null position.